United States Patent
Chauhan et al.

(10) Patent No.: US 12,466,349 B2
(45) Date of Patent: Nov. 11, 2025

(54) VEHICLE AND OFF-ROAD VEHICLE IGNITION SENSE AND CONTROL CIRCUIT FOR AN ELECTRONIC CONTROL UNIT (ECU)

(71) Applicant: DANFOSS A/S, Nordborg (DK)

(72) Inventors: Rohit Tejsingh Chauhan, Pune (IN); Steven Lee Hum, Minnetonka, MN (US)

(73) Assignee: Danfoss, A/S, Nordborg (DK)

( * ) Notice: Subject to any disclaimer, the term of this patent is extended or adjusted under 35 U.S.C. 154(b) by 26 days.

(21) Appl. No.: 18/574,212

(22) PCT Filed: Jun. 30, 2022

(86) PCT No.: PCT/IB2022/056126
§ 371 (c)(1),
(2) Date: Dec. 26, 2023

(87) PCT Pub. No.: WO2023/275827
PCT Pub. Date: Jan. 5, 2023

(65) Prior Publication Data
US 2024/0351539 A1      Oct. 24, 2024

(30) Foreign Application Priority Data

Jun. 30, 2021   (IN) .............. 202111029355

(51) Int. Cl.
*B60R 16/03*      (2006.01)
*B60W 10/04*      (2006.01)
(52) U.S. Cl.
CPC ............. *B60R 16/03* (2013.01); *B60W 10/04* (2013.01)

(58) Field of Classification Search
CPC ....... B60R 16/03; B60W 10/04; B60W 10/06; B60W 10/08
(Continued)

(56) References Cited

U.S. PATENT DOCUMENTS 5,742,150 A * 4/1998 Khuwatsamrit .... H02J 7/00306
                                                          320/121
5,821,755 A * 10/1998 Henze ................... H02M 3/156
                                                          324/426

(Continued)

FOREIGN PATENT DOCUMENTS

EP       1959561 A2     8/2008

OTHER PUBLICATIONS

International Search Report and Written Opinion for PCT/IB2022/056126, mailed Oct. 13, 2022.

*Primary Examiner* — Levi Gannon
(74) *Attorney, Agent, or Firm* — Merchant & Gould P.C.

(57) ABSTRACT

A low-cost compact ignition sense and control circuit is powered by a battery supply line of a vehicle and receives an ignition input signal indicating the turning ON/OFF of a vehicle. Responsive to the ignition input signal, the ignition sense and control circuit utilizes first and second MOSFETS to control an ON/OFF state of a main internal power supply of an ECU or to control an activate/deactivate state of a microprocessor of the ECU. When the MOSFETS are ON, voltage from the battery supply line is used to either latch the main internal power supply of the ECU to an ON state or to latch the microprocessor of the ECU into an ON state. An OFF signal at the ignition input signal releases the latch to provide a shutdown of the main internal power supply or microprocessor.

12 Claims, 5 Drawing Sheets

(58) Field of Classification Search
USPC ........................................................ 307/10.6
See application file for complete search history.

(56) References Cited

U.S. PATENT DOCUMENTS

| | | | |
|---|---|---|---|
| 6,288,881 B1 | 9/2001 | Melvin et al. | |
| 6,882,061 B1* | 4/2005 | Ashtiani | H02J 7/00712 |
| | | | 219/209 |
| 6,888,354 B1* | 5/2005 | Gofman | H02J 7/0036 |
| | | | 324/432 |
| 2004/0124705 A1* | 7/2004 | Nozawa | H02J 7/0032 |
| | | | 307/10.1 |
| 2005/0216135 A1* | 9/2005 | Sayama | B60R 16/03 |
| | | | 701/1 |
| 2008/0211439 A1* | 9/2008 | Yokota | H02P 6/10 |
| | | | 318/400.21 |
| 2012/0013175 A1* | 1/2012 | Newman, Jr. | B60R 16/033 |
| | | | 320/109 |
| 2013/0103203 A1* | 4/2013 | Masuda | F02D 41/08 |
| | | | 903/930 |
| 2018/0053313 A1 | 2/2018 | Smith | |

* cited by examiner

VEHICLE AND OFF-ROAD VEHICLE IGNITION SENSE AND CONTROL CIRCUIT FOR AN ELECTRONIC CONTROL UNIT (ECU)

This application is a National Stage Application of PCT/IB2022/056126 filed on Jun. 30, 2022, which claims the benefit of and priority to Indian Provisional patent application No. 202111029355, filed Jun. 30, 2021, the entire disclosures of which are incorporated by reference herein in their entirety. To the extent appropriate, a claim of priority is made to each of the above-disclosed applications.

TECHNICAL FIELD

The present disclosure is directed to an ignition sense and control circuit and, more particularly, to an ignition sense and control circuit for an electronic control unit used in automotive vehicle applications and off-road automotive vehicle applications.

BACKGROUND

An electronic control unit (ECU) is a component that typically includes a microprocessor, an internal power supply, a memory, a communication interface unit, and a signal processing unit that is programmed to control one or more electronic functions of a vehicle or off-road vehicle. For example, an ECU may be used to control a plurality of solenoid coils controlling the actuation of hydraulic valves in a hydraulic system of an off-road vehicle or may be used to drive an electric motor of a vehicle. When the ECU is used to drive high power loads, such as the solenoid coils and electric motor, the power supply of the ECU is directly connected to the vehicle's battery to reduce electrical current load on the ignition switch. The ECU also typically includes an electrical circuit to sense a status of an ignition pin to control an operational state of the ECU.

SUMMARY

According to the present disclosure, a low-cost compact ignition sense and control circuit can replace the logic gates, operational amplifier integrated circuit (IC), reference signal IC, and reference power IC typically found in a standard or typical ignition sense and control circuit of a vehicle or off-road vehicle electronic control unit (ECU). The low-cost compact ignition sense and control circuit is powered by a battery supply line of a vehicle and receives an ignition input signal indicating the turning ON/OFF of a vehicle. Responsive to the ignition input signal, the ignition sense and control circuit utilizes first and second MOSFETS to control an ON/OFF state of a main internal power supply of the ECU or to control an activate/deactivate state of a microprocessor of the ECU. When the MOSFETS are ON, voltage from the battery supply line is used to either latch the main internal power supply of the ECU to an ON state or to latch the microprocessor of the ECU into an ON state. An OFF signal at the ignition input signal releases the latch to provide a shutdown of the main internal power supply or microprocessor, respectively.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. Further, for example, the term "including" shall mean "including, but not limited to."

According to the present disclosure, a low-cost compact ignition sense and control circuit can replace the logic gates, operational amplifier integrated circuit (IC), reference signal IC, and reference power IC typically found in a standard or typical ignition sense and control circuit of a vehicle or off-road vehicle electronic control unit (ECU). The low-cost compact ignition sense and control circuit is powered by a battery supply line of a vehicle and receives an ignition input signal indicating the turning ON/OFF of a vehicle. Responsive to the ignition input signal, the ignition sense and control circuit utilizes first and second MOSFETS (metal-oxide-semiconductor field-effect transistor) Q1A, Q2A to control an ON/OFF state of a main internal power supply of the ECU or to control an activate/deactivate state of a microprocessor of the ECU. When the MOSFETS Q1A, Q2A are ON, voltage from the battery supply line is used to either latch the main internal power supply of the ECU to an ON state or to latch the microprocessor of the ECU into an ON state. An OFF signal at the ignition input signal releases the latch to provide a shutdown of the main internal power supply or microprocessor, respectively.

Figure 1:
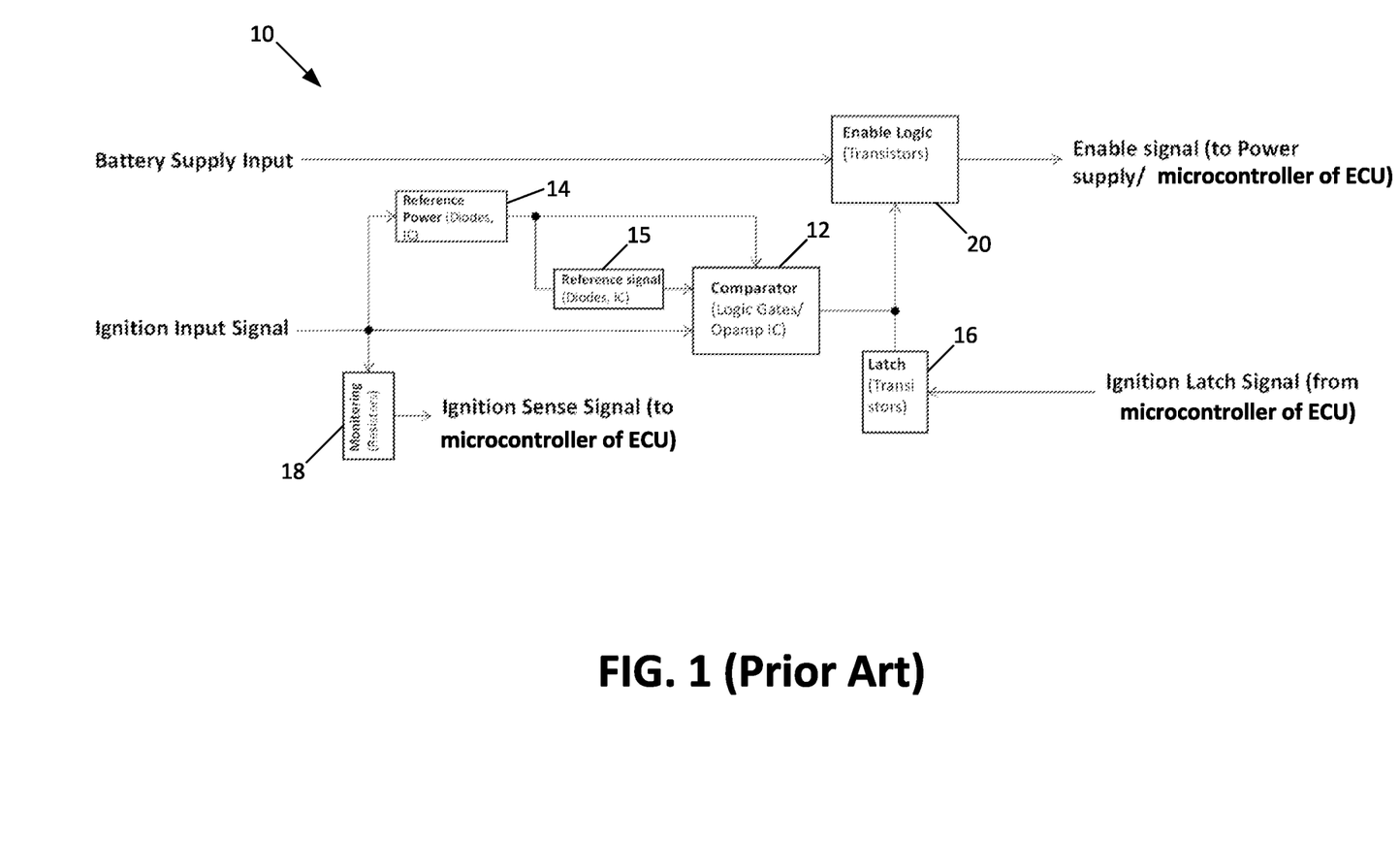
FIG. 1 is block diagram example of a typical prior art ignition sense and control circuit.

Referring to FIG. 1, an example of a typical prior art ignition sense and control circuit 10 is illustrated. As shown the typical ignition sense and control circuit 10, which is used in a vehicle or off-road vehicle to enable or disable an electronic control unit (ECU) of the vehicle, includes a comparator 12 (implemented using logic gates or an operational amplifier integrated circuit (IC)), a reference IC 14 for power and a reference IC 15 for generating a reference signal, a latch logic 16 (typically implemented with one or more transistors), an ignition signal monitor 18 (typically implemented with one or more resistors), and an enable circuit 20 (typically implemented with one or more transistors). In this typical circuit, an enable signal supplied to a power supply and/or microcontroller of an ECU (not shown) is generated when an output of the comparator 12 is active; the output of the comparator 12 is active when an ignition input signal is greater than a reference signal. The ignition latch signal is generated by the microcontroller of the ECU to latch an output state of the enable logic 20 after successful generation of a first enable signal. By monitoring an ignition sense signal with the ignition signal monitor 18, the microcontroller of the ECU can make a decision as to when to release the ignition latch signal for a safe shutdown of the ECU. This typical implementation utilizes a significant number of electronic components presenting costly a configuration that can occupy a significant amount of space. As such, if cost and printed circuit board (PCB) space constraints are of concern, a redesign of the typical ignition sense and control circuit 10 is required.

Figure 2A:
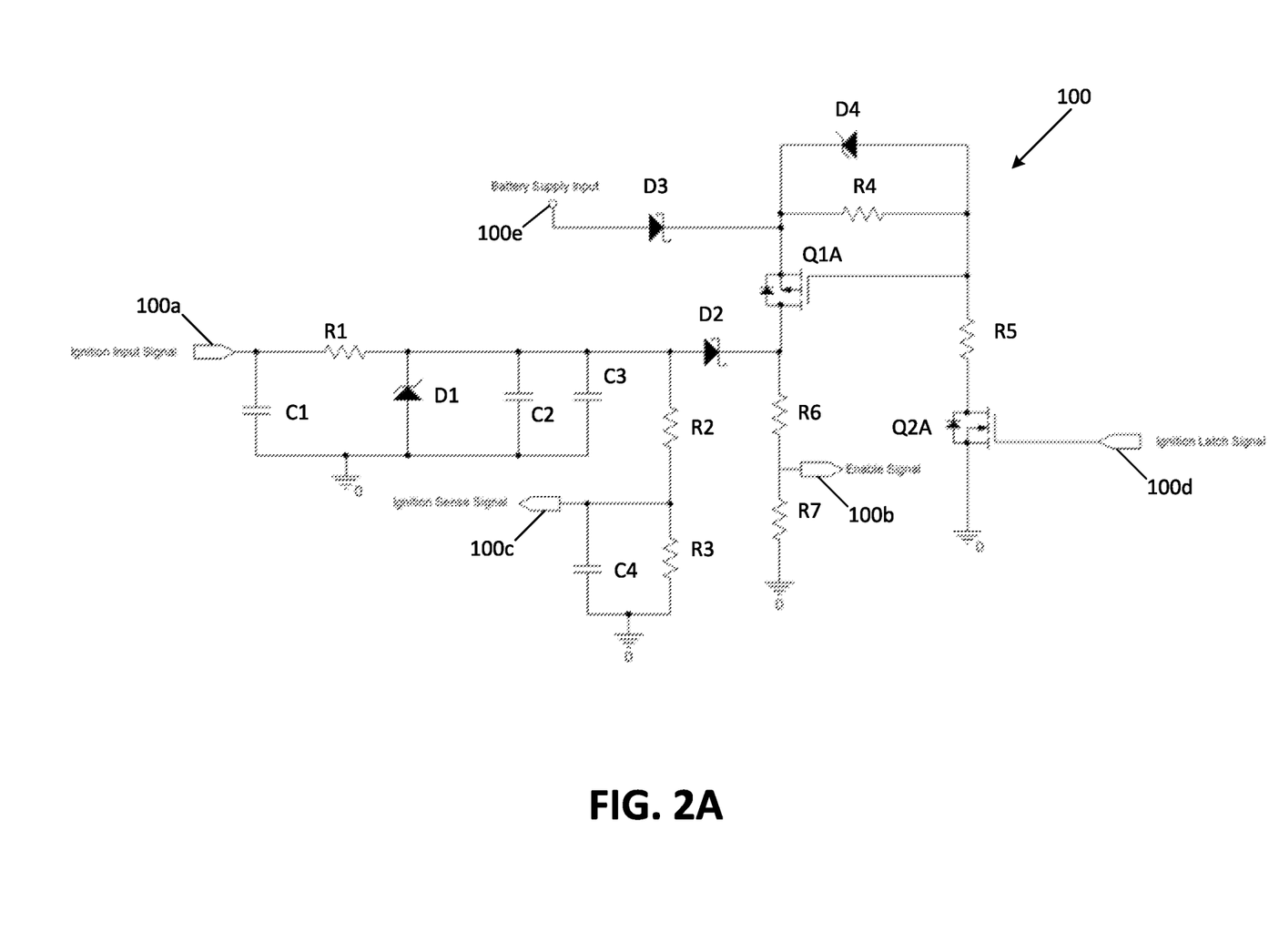
FIGS. 2A-2B are a circuit diagram and a block diagram, respectively, of an ignition sense and control circuit according to the present disclosure.

Referring to FIG. 2A, an ignition sense and control circuit 100 according to the present disclosure provides a circuit configuration with a reduced number of components for a more compact PCB presentation and a reduced cost. The ignition sense and control circuit 100 is used in a vehicle or off-road vehicle to enable or disable an electronic control unit (ECU) of the vehicle. As shown, the ignition sense and control circuit 100 includes capacitors C1, C2, C3, and C4, resistors R1, R2, R3, R4, R5, R6, and R7; diodes D1, D2, D3, and D4; as well as a P-channel MOSFET Q1A (e.g. the channel of the MOSFET is composed of a majority of holes as current carriers) and an N-channel MOSFET Q2A (e.g. the channel of the MOSFET is composed of a majority of electrons as current carriers). The ignition sense and control circuit 100 is electrically coupled to a battery supply line of the vehicle (e.g., the 12 V battery supply line) at a battery supply input 100*e* and receives an ignition input signal 100*a* from an ignition switch activated by a user to start/turn off the vehicle.

In operation, when the ignition input signal 100*a* is ON (Voltage>Von), the ignition input signal 100*a* powers up the ECU by providing a signal at enable signal 100*b* which is used to turn ON an internal main power supply of the ECU (or used to turn ON a microprocessor of the ECU). Accordingly, unless the ignition input signal 100*a* is high (ON), the internal main power supply of the ECU (or the microprocessor of the ECU) is OFF resulting in less current being drawn through the battery supply line of the vehicle. The ignition input signal 100*a* is also read by a microprocessor of the ECU as an analog input ignition sense signal 100*c* indicating to the microprocessor whether ignition has or has not occurred; when ignition has occurred the microprocessor of the ECU is booted.

After booting of the microprocessor of the ECU, the microprocessor holds the internal main power supply of the ECU (or the microprocessor) ON by setting the ignition latch signal 100*d* high. Setting the ignition latch signal 100*d* high causes the N-channel MOSFET Q2A to turn ON. The turning ON of Q2A causes the turning ON of the P-Channel MOSFET Q1A. As such, Q2A controls the ON/OFF state of Q1A, e.g., when Q2A is on, Q1A is ON and when Q2A is OFF, Q1A is OFF. As such, the ignition latch signal 100*d* controlling the ON/OFF state of Q2A is used to control the ON/OFF state of the main internal power supply of the ECU (or is used to activate/deactivate the microprocessor of the ECU).

Once Q1A is ON, voltage from the battery supply line of the vehicle is used to maintain the main internal power supply of the ECU (or maintain the microprocessor) in an ON state by providing a voltage signal at enable signal 100*b*. When the ignition is turned OFF (Voltage<Voff), e.g., the ignition input signal 100*a* is OFF, the microprocessor of the ECU is programmed to complete its current task, such as storing critical values in flash memory, etc., and release the ignition latch signal 100*d* to low, providing a safe shutdown of the ECU main internal power supply (or safe shutdown of the ECU microprocessor). Note that Von and Voff are ECU turn ON and OFF voltage levels that can be set by selecting a suitable value for resistors R6 and R7.

Figure 2B:
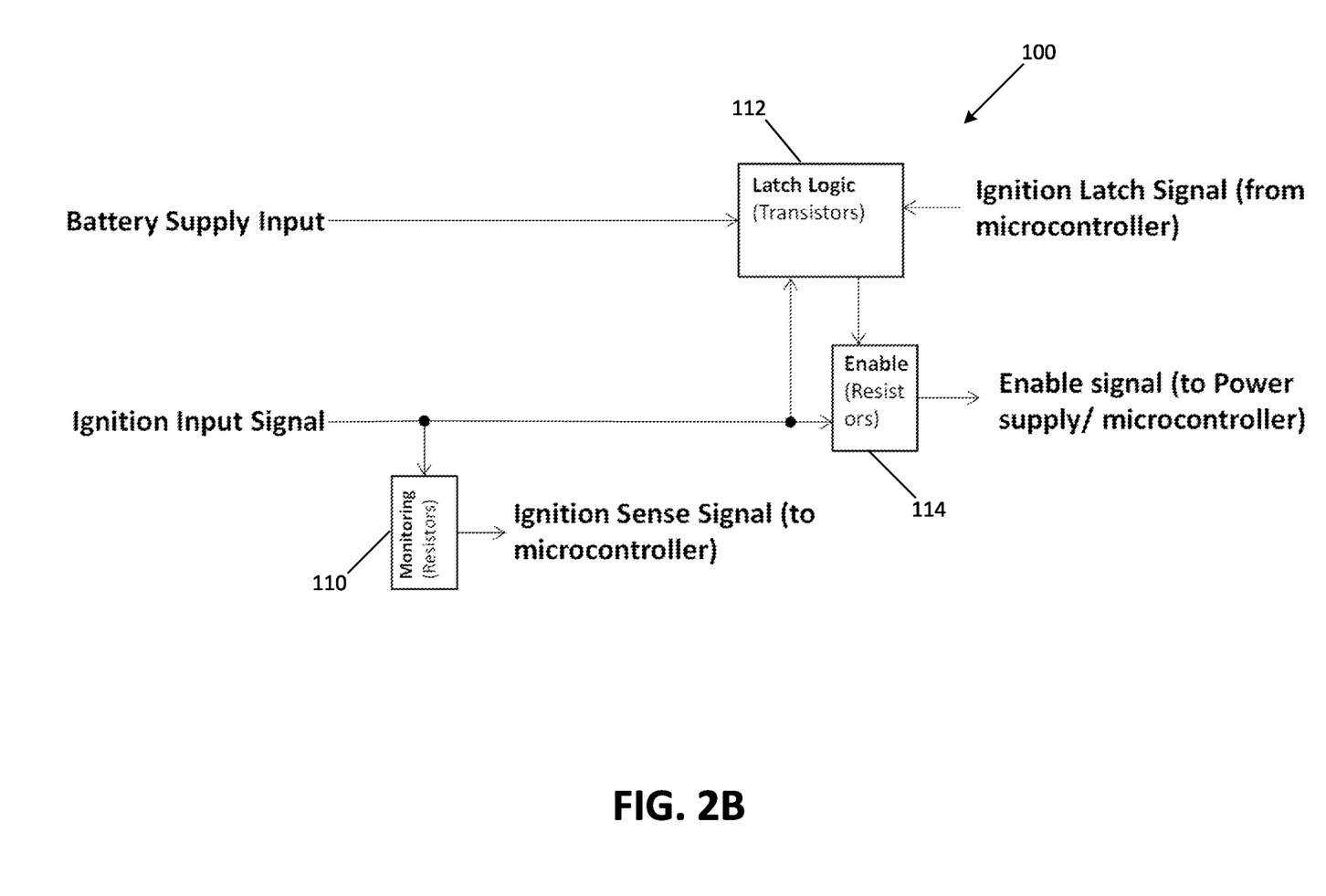

FIG. 2B is a block diagram representation of the ignition sense and control circuit 100 of FIG. 2A and enables a comparison with the typical ignition sense and control circuit 10 of FIG. 1. In FIG. 2B, the ignition sense and control circuit 100 includes an ignition signal monitor 110, a latch logic 112, and an enable circuit 114.

As shown, the circuit 100 has provided similar functionality as the circuit 10; however, the functionality is provided in combination with an elimination of the logic gates and operational amplifier IC of the comparator 12, an elimination of the diodes and IC of the reference power IC 14, and an elimination of the diodes and IC of the reference signal IC 15.

Figure 3:
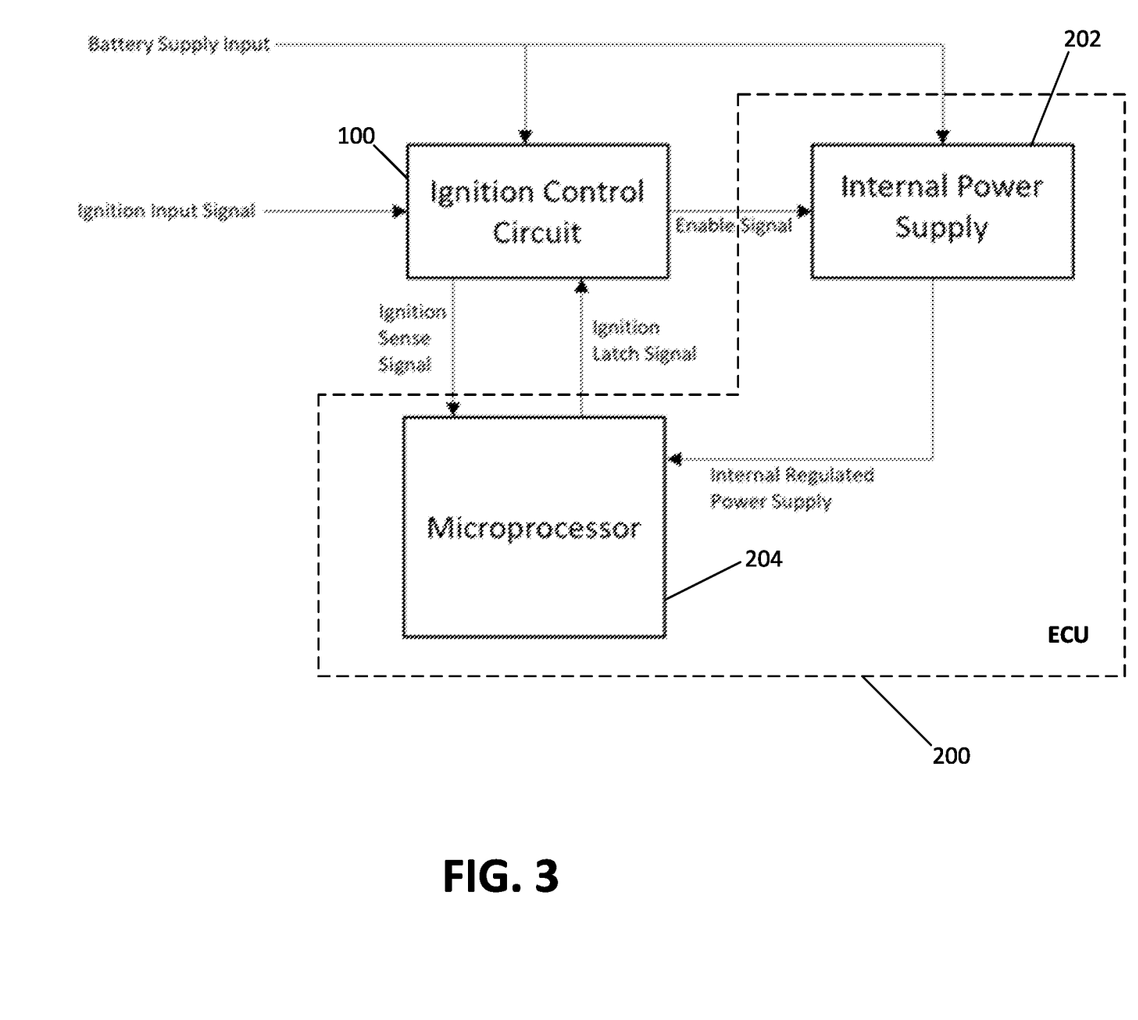
FIG. 3 is a block diagram illustrating use of the ignition sense and control circuit to control an internal power supply of an electronic control unit (ECU).

FIG. 3 provides an illustration of an example use of the ignition sense and control circuit 100 to control a main internal power supply 202 of an ECU 200. In the example shown, the battery supply line of the vehicle supplies power directly to the ignition sense and control circuit 100 and the main internal power supply 202 of the ECU 200. The ignition sense and control circuit 100 receives the ignition input signal 100*a* and utilizes the ignition input signal 100*a* to generate the ignition sense signal 100*c* input to a microprocessor 204 of the ECU 200 and enable signal 100*b* input to the main internal power supply 202 of the main ECU 200 as described herein with reference to FIG. 2. The microprocessor 204 of the ECU 200 is powered by the main internal power supply 202 and generates the ignition latch signal 100*d*, which is used as described herein with reference to FIG. 2.

Figure 4:
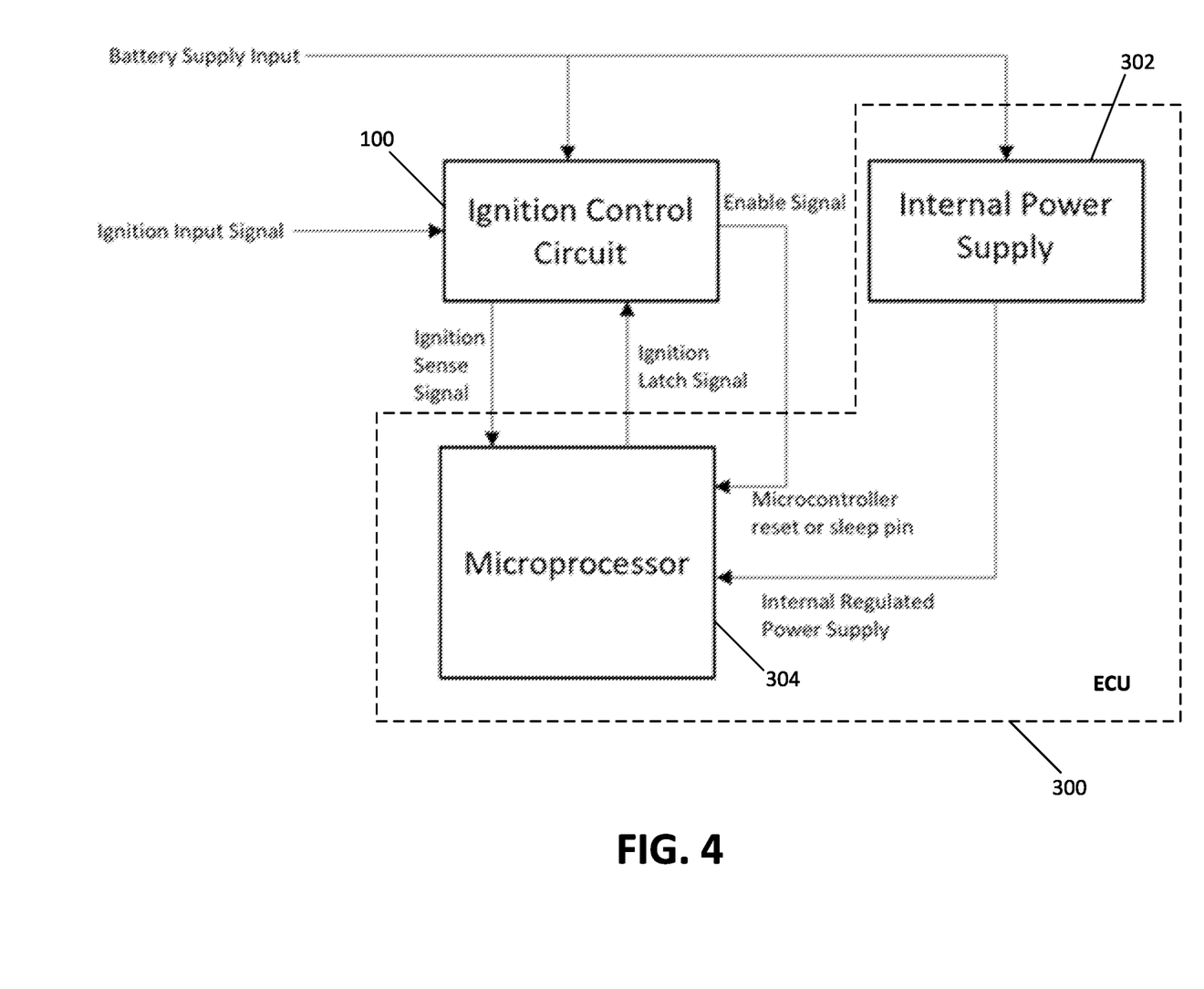
FIG. 4 is a block diagram illustrating use of the ignition sense and control circuit to control microprocessor of an electronic control unit (ECU).

FIG. 4 provides an illustration of another example use of the ignition sense and control circuit 100 to control a microprocessor 304 of an ECU 300. In the example shown, the battery supply line of the vehicle supplies power directly to the ignition sense and control circuit 100 and a main internal power supply 302 of the ECU 300. The ignition sense and control circuit 100 receives the ignition input signal 100*a* and utilizes the ignition input signal 100*a* to generate the ignition sense signal 100*c* input to the microprocessor 304 of the ECU 300 and enable signal 100*b* input to the microprocessor 304 of the main ECU 300 as described herein with reference to FIG. 2. The microprocessor 304 of the ECU 300 is powered by the main internal power supply 302 and generates the ignition latch signal 100*d*, which is used as described herein with reference to FIG. 4.

In view of the above, it can be appreciated that the ignition sense and control circuit 100 can be used in a motor vehicle or off-road motor vehicle to enable or disable an ECU. Use of the ignition sense and control circuit 100 enables the elimination of the logic gates and operational amplifier of the comparator 12 as well as the reference ICs 14, 15 of the prior art ignition sense and control circuit 10, thereby reducing cost and PCB space for applications where cost and space are a concern.

The ignition sense and control circuit 100 provides that when the ignition input signal 100*a* is ON, the ECU will be powered up and when the ignition input signal 100*a* is OFF, the ECU will draw a minimal current (e.g., less than a 10 mA current) from the battery supply line. The ignition input signal 100*a* can be read by the microprocessor of the ECU as an analog input ON at the ignition sense signal 100*c*. In response to the ignition sense signal 100*c*, the microprocessor of the ECU can either hold the main internal power supply of the ECU ON or can boot the microprocessor by setting the ignition latch signal 100*d* ON. When the ignition sense signal 100*c* is OFF, the microprocessor of the ECU can complete its current task and release the ignition latch signal 100*d* for a safe shutdown of the ECU main internal power supply or safe shutdown of the microprocessor. Note that the ignition sense and control circuit 100 includes protection against a load dump, an overvoltage or reverse voltage at the ignition input signal 100*a* through use of a transient protection diode D1. The use of MOSFETS and diodes in ignition sense and control circuit 100 provides for a circuit that can be compact (e.g., taking up minimal space on a printed circuit board (PCB)) and low-cost, which is particularly useful in designs where PCB space and cost are important considerations.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed:

1. An ignition sense and control circuit for a motor vehicle, comprising:
    a printed circuit board (PCB) supporting a circuit including first and second MOSFETS powered by a battery supply line of the motor vehicle;
    the circuit receiving an ignition input signal indicating an ON state of the vehicle;
    responsive to the ignition input signal indicating an ON state, the first and second MOSFETS control an ON/OFF state of an electronic control unit (ECU) of the vehicle by enabling voltage from the battery supply line to latch a main internal power supply of the ECU to an ON state with a latch;
    wherein the first MOSFET includes a first terminal and a gate terminal, the gate terminal configured to receive an ignition latch signal, and wherein the second MOSFET includes a gate terminal connected to the first terminal of the first MOSFET.

2. The ignition sense and control circuit of claim 1, wherein one of the first and second MOSFETS comprises an N-channel MOSFET and wherein the other of the first and second MOSFETS comprises a P-channel MOSFET.

3. The ignition sense and control circuit of claim 1, wherein the ignition input signal is read by a microprocessor of the ECU as an analog input indicating to the microprocessor that ignition has occurred causing a boot of the microprocessor with the microprocessor holding the main internal power supply in the ON state with the latch.

4. The ignition sense and control circuit of claim 3, wherein latching the main internal power supply of the ECU to the ON state causes one of the first and second MOSFETS to turn ON which causes the other of the first and second MOSFETS to turn ON.

5. The ignition sense and control circuit of claim 4, wherein the main internal power supply of the ECU is maintained in an ON state with voltage from the battery supply line upon turning ON of one of the first and second MOSFETS.

6. The ignition sense and control circuit of claim 1, wherein the circuit receiving an ignition input signal indicating an OFF state of the vehicle causes a release of the latch and a shutdown of the main internal power supply of the ECU.

7. The ignition sense and control circuit of claim 1, wherein the main internal power supply of the ECU is maintained in an ON state with voltage from the battery supply line upon turning ON of one of the first and second MOSFETS.

8. The ignition sense and control circuit of claim 1, wherein the ignition sense and control circuit does not include a reference power integrated circuit.

9. An ignition sense and control circuit for a motor vehicle comprising:
    a printed circuit board (PCB) supporting a circuit including first and second MOSFETS powered by a battery supply line of a motor vehicle;
    the circuit receiving an ignition input signal indicating an ON state of the vehicle;
    responsive to the ignition input signal indicating an ON state, the first and second MOSFETS controlling an ON/OFF state of a microprocessor of an electronic control unit (ECU) of the vehicle by enabling voltage from the battery supply line to latch the microprocessor of the ECU to an ON state with a latch;
    wherein the ignition input signal is read by the microprocessor of the ECU as an analog input indicating to the microprocessor that ignition has occurred causing a boot of the microprocessor with the microprocessor holding an internal main power supply in the ON state with the latch;
    wherein latching the microprocessor of the ECU to the ON state causes one of the first and second MOSFETS to turn ON which causes the other of the first and second MOSFETS to turn ON; and;
    wherein the microprocessor of the ECU is maintained in the ON state with voltage from the battery supply line upon turning ON of one of the first and second MOSFETS.

10. The ignition sense and control circuit of claim 9, wherein one of the first and second MOSFETS comprises an N-channel MOSFET and wherein the other of the first and second MOSFETS comprises a P-channel MOSFET.

11. The ignition sense and control circuit of claim 9, wherein the circuit receiving an ignition input signal indicating an OFF state of the vehicle causes a release of the latch and a shutdown of the microprocessor of the ECU.

12. An ignition sense and control circuit for a motor vehicle, comprising:
    a printed circuit board (PCB) supporting a circuit including first and second MOSFETS powered by a battery supply line of the motor vehicle;
    the circuit receiving an ignition input signal indicating an ON state of the vehicle;
    responsive to the ignition input signal indicating an ON state, the first and second MOSFETS control an ON/OFF state of an electronic control unit (ECU) of the vehicle by enabling voltage from the battery supply line to latch a main internal power supply of the ECU to an ON state with a latch; and wherein the main internal power supply of the ECU is maintained in an ON state with voltage from the battery supply line upon turning ON of one of the first and second MOSFETS.

* * * * *